United States Patent
Huth et al.

(10) Patent No.: US 11,767,819 B2
(45) Date of Patent: Sep. 26, 2023

(54) SPACER MATERIAL, FOR REDUCING A BOND GAP BETWEEN A BEAM STRUCTURE AND A BLADE SHELL OF A SEGMENTED ROTOR BLADE

(71) Applicant: General Electric Company, Schenectady, NY (US)

(72) Inventors: Scott Jacob Huth, Greenville, SC (US); Andrew Mitchell Rodwell, Greenville, SC (US); Andrew Ross Collier, Greenville, SC (US); Alec Antonio Lopez, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/290,330

(22) PCT Filed: Nov. 1, 2018

(86) PCT No.: PCT/US2018/058713
§ 371 (c)(1),
(2) Date: Apr. 30, 2021

(87) PCT Pub. No.: WO2020/091791
PCT Pub. Date: May 7, 2020

(65) Prior Publication Data
US 2021/0404437 A1    Dec. 30, 2021

(51) Int. Cl.
*F03D 1/06*      (2006.01)
*B29D 99/00*      (2010.01)

(52) U.S. Cl.
CPC ....... *F03D 1/0675* (2013.01); *B29D 99/0028* (2013.01); *F05B 2230/23* (2013.01); *F05B 2240/302* (2013.01)

(58) Field of Classification Search
CPC .... F03D 1/0633; F03D 1/0641; F03D 1/0675; F03D 1/0683; F05B 2230/23; F05B 2240/302; B29D 99/0028
See application file for complete search history.

(56) References Cited

U.S. PATENT DOCUMENTS

| 851,196 A | 4/1907 | Bevans et al. |
|---|---|---|
| 4,474,536 A | 10/1984 | Gougeon et al. |

(Continued)

FOREIGN PATENT DOCUMENTS

| CN | 107120229 A | 9/2017 |
|---|---|---|
| DK | 201170097 A | 8/2012 |

(Continued)

OTHER PUBLICATIONS

Foreign Office Action with translation for CN application No. 201880100578.0, dated Aug. 3, 2022.

(Continued)

*Primary Examiner* — Courtney D Heinle
*Assistant Examiner* — Sang K Kim
(74) *Attorney, Agent, or Firm* — Dority & Manning, P.A.

(57) ABSTRACT

A rotor blade for a wind turbine including first and second blade segments extending in opposite directions from a chord-wise joint. The first and second blade segments include one or more shell members and internal support structures coupled to an inner surface of the one or more shell members of the first and second blade segments. The internal support structure of the first blade segment includes a beam structure extending between a first end at the chord-wise joint and a second end such that the beam structure is received by a receiving section of the internal support structure of the second blade segment. The rotor blade includes one or more spacer materials arranged within the first blade segment between an exterior surface of the (Continued)

beam structure and the inner surface of the one or more shell members to reduce a bond gap therebetween.

19 Claims, 6 Drawing Sheets

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A | 1/1994 | Hanson | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 * | 4/2011 | Riddell | F03D 80/30 416/224 |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 * | 2/2013 | Kawasetsu | F03D 13/10 416/226 |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 | 6/2017 | Zamora Rodriguez et al. | |
| 9,790,919 B2 * | 10/2017 | Leonard | F03D 1/0675 |
| 10,544,776 B2 * | 1/2020 | Danielsen | F03D 1/0675 |
| 10,563,636 B2 * | 2/2020 | Yarbrough | F03D 1/0683 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2014/0301855 A1 | 10/2014 | Busbey et al. | |
| 2015/0204200 A1 | 7/2015 | Eyb et al. | |
| 2015/0369211 A1 | 12/2015 | Merzhaeuser | |
| 2017/0002660 A1 | 1/2017 | Samudrala et al. | |
| 2017/0363063 A1 | 12/2017 | Yarbrough et al. | |
| 2018/0223796 A1 | 8/2018 | Yarbrough et al. | |
| 2019/0358911 A1 * | 11/2019 | Hedges | B29C 66/961 |
| 2021/0381493 A1 * | 12/2021 | Aubrion | F03D 1/0675 |

FOREIGN PATENT DOCUMENTS

| | | |
|---|---|---|
| EP | 2186622 A1 | 5/2010 |
| EP | 3144526 A1 | 3/2017 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO 2011/006563 A2 | 1/2011 |
| WO | WO2011/064553 A2 | 6/2011 |
| WO | WO2011/066279 A2 | 6/2011 |
| WO | WO 2012/004571 A2 | 1/2012 |
| WO | WO2015/051803 A1 | 4/2015 |
| WO | WO2015/185066 A1 | 12/2015 |

OTHER PUBLICATIONS

Foreign Office Action with translation for JP application No. 2021-522950, dated Jul. 21, 2022.

* cited by examiner

SPACER MATERIAL, FOR REDUCING A BOND GAP BETWEEN A BEAM STRUCTURE AND A BLADE SHELL OF A SEGMENTED ROTOR BLADE

FIELD

The present disclosure relates generally to wind turbines, and more particularly to a spacer material for reducing a bond gap between a beam structure and a blade shell of a segmented rotor blade.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance, and strength of the rotor blade, the body shell is typically reinforced using one or more structural components (e.g., opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

Various rotor blades may be divided into two or more segments and assembled to form a completed rotor blade. Each segment of a segmented rotor blade generally includes suction and pressure side shells and one or more structural components. Such segments and their respective components are typically assembled at joints between segments. Certain segmented rotor blades utilize one or more scarf connections to join the structural components of the segments.

For instance, a first blade segment may include a beam structure receivable into a receiving section of a second blade segment. Generally, the beam structure of the first blade segment typically tapers in order to fit within the receiving section of the second blade segment. However, the pressure and suction shells generally define a smooth transition between the first and second blade segments. As such, the tapered portion of the beam structure may create a gap between the beam structure and the inner pressure and/or suction side surfaces of the shell halves. In addition, certain materials used to form the beam structure (e.g., carbon fiber composites and/or carbon fiber pultrusions) may be relatively structurally stiff and therefore difficult to manipulate within the scarf joint, further contributing to the size of the gap. Such a gap may be undesirable as it may increase a bond dimension between the structural component and the respective shell halves, may increase the risk of delamination, may increase the cost of production of the turbine blade, and/or may necessitate undesirable repair procedures.

Accordingly, the present disclosure is directed to a beam structure for a segmented rotor blade having an improved rotor blade that includes a spacer material between the beam structure and the blade shell so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments include one or more shell members and an internal support structure. The internal support structure of the first blade segment includes a beam structure extending between a first end at the chord-wise joint and a second end. The internal support structure of the second blade segment includes a receiving section that receives the beam structure of the first blade segment. Further, the beam structure and the receiving section are each coupled to an inner surface of the one or more shell members of the first blade segment and the second blade segment, respectively. Additionally, the rotor blade includes one or more spacer materials arranged within the first blade segment between an exterior surface of the beam structure and the inner surface of the one or more shell members. As such, the spacer material(s) reduces a bond gap between the exterior surface of the beam structure and the inner surface of the one or more shell members.

In another embodiment, the spacer material(s) may be adjacent to the first end of the beam structure and extends in a span-wise direction towards the second end. In one such embodiment, the spacer material(s) may extend from the chord-wise joint along the beam structure up to about 50% of a length of the first blade segment. In a further embodiment, the spacer material(s) may substantially fill the bond gap between the exterior surface of the beam structure and the inner surface of the one or more shell members. In a further embodiment, the second blade segment may define a second bond gap between an exterior surface of the receiving section the inner surface of the one or more shell members. Moreover, the second bond gap may be less than the bond gap. In such an embodiment, the spacer material(s) may define a thickness of approximately a difference between the second bond gap and the first bond gap.

In one embodiment, shell member(s) include a suction side shell member and a pressure side shell member. In such an embodiment, the beam structure of the first blade segment may include a suction side spar structure coupled to the inner surface of the suction side shell member and a pressure side spar structure coupled to the inner surface of the pressure side shell member. Moreover, in such an embodiment, the suction side and pressure side spar structures may taper from the first end to the second end. In one such embodiment, the one or more spacer materials may include a suction side spacer material arranged between an exterior surface of the suction side spar structure and the inner surface of the suction side shell member and a pressure side spacer material arranged between an exterior surface of the pressure side spar structure and the inner surface of the pressure side shell member. In a further embodiment, the spacer material(s) may be secured to the exterior surface of the beam structure and the inner surface of the pressure side shell member and/or the suction side shell member via an adhesive.

In one embodiment, the spacer material(s) may be constructed, at least in part, from at least one of a foam material, a wood material, a cork material, a fiber material, a composite material, or combinations thereof. In one exemplary embodiment, the beam structure may be constructed, at least in part, of a pultruded carbon composite material. For instance, at least one of the suction side spar structure or the pressure side spar structure may include a pultruded carbon composite material.

In yet another aspect, the present disclosure is directed to a method of joining a first blade segment of a rotor blade of a wind turbine to a second blade segment of the rotor blade of the wind turbine at a chord-wise joint. Each of the first and second rotor blade segments includes one or more shell members and an internal support structure. The method includes forming a beam structure of the internal support structure of the first blade segment. The method further includes forming a receiving section of the internal support structure of the second blade segment. Another step includes securing one or more spacer materials to an exterior surface of the beam structure and/or an inner surface of the shell member(s) of the first blade segment. The method also includes inserting the beam structure of the first blade segment into the receiving section of the second blade segment. As such, the one or more spacer materials reduce a bond gap between the exterior surface of the beam structure and the inner surface of the shell member(s). Additionally, the method includes securing the first and second blade segments together.

In one embodiment, the one or more shell members include a suction side shell member and a pressure side shell member. In such an embodiment, securing the one or more spacer materials to an exterior surface of the beam structure and/or an inner surface of the shell member(s) of the first blade segment may further include securing the spacer material(s) to the exterior surface of the beam structure and subsequently securing the beam structure to at the pressure side shell member and/or the suction side shell member of the first blade segment.

In another embodiment, securing the one or more spacer materials to an exterior surface of the beam structure and/or an inner surface of the shell member(s) of the first blade segment may further include securing the spacer material(s) to the pressure side shell member and/or the suction side shell member of the first blade segment and subsequently securing the beam structure to the one or more spacer materials.

In a still further embodiment, securing the one or more spacer materials to an exterior surface of the beam structure and/or an inner surface of the shell member(s) of the first blade segment may further include securing the spacer material(s) to an exterior surface of a pressure side spar structure and/or a suction side spar structure located on a pressure side and a suction side of the first blade segment, respectively. In one such embodiment, the one or more spacer materials may include a suction side spacer material and a pressure side spacer material. As such, the method may further include securing the suction side spacer material to an exterior surface of a suction side spar structure located on the suction side of the first blade segment and/or the inner surface of the suction side shell member of the first blade segment. Additionally, the method may include securing the pressure side spacer material to an exterior surface of a pressure side spar structure located on the pressure side of the first blade segment and/or the inner surface of the pressure side shell member of the first blade segment. It should be understood that the method may further include any of the additional features as described herein.

In yet another aspect, the present disclosure is directed to a rotor blade for a wind turbine. The wind turbine includes a first blade segment and a second blade segment extending in opposite directions from a chord-wise joint. Each of the first and second blade segments includes a pressure side shell member, a suction side shell member, and an internal support structure. The rotor blade further includes one or more spacer materials positioned adjacent to an inner surface of the pressure side or suction side shell member of the first blade segment and configured so as to provide a linear mounting surface. The internal support structure of the first blade segment includes a beam structure positioned adjacent to the linear mounting surface of the spacer material(s). Further, the internal support structure of the second blade segment includes a receiving section. As such, the beam structure is received within the receiving section so as to join the first and second blade segments together. It should be understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
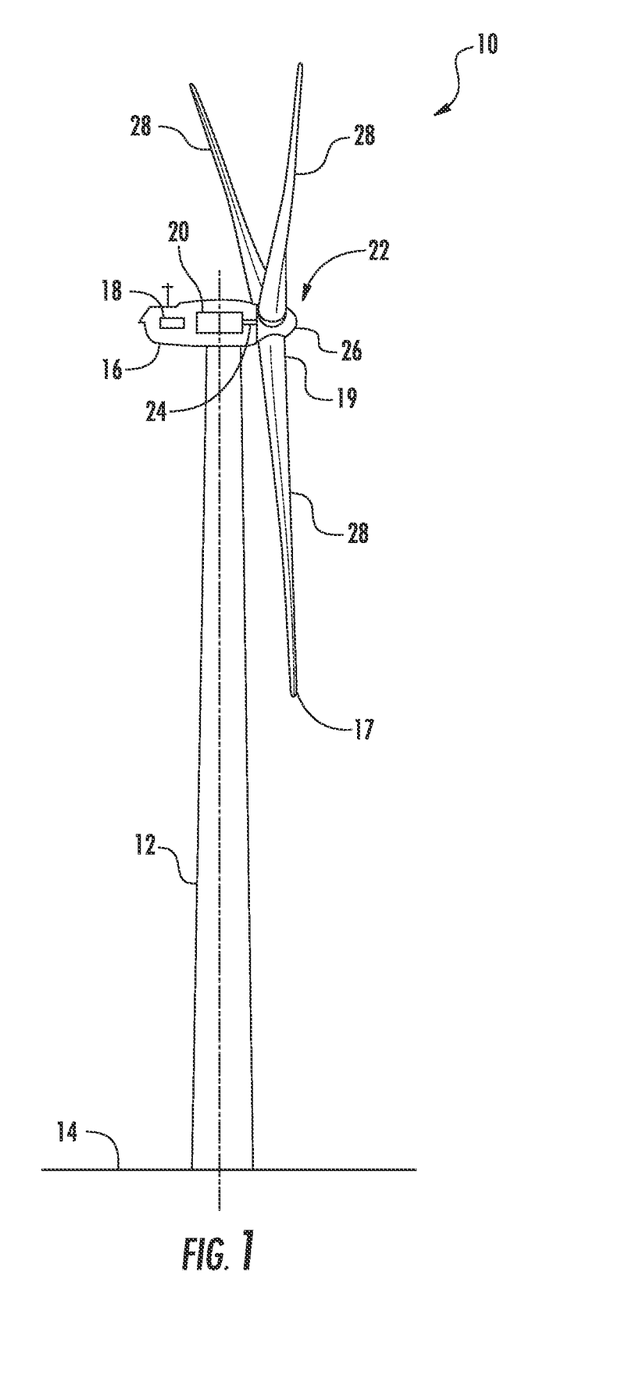
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
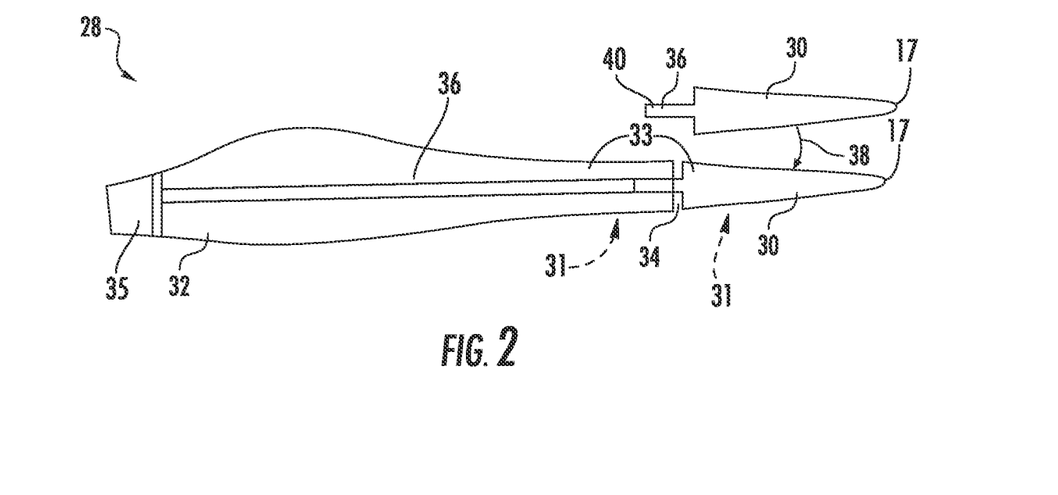
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include a one or more shell members and an internal support structure 36. In certain embodiments, the one or more shell members may include a pressure side shell member 31 and a suction side shell member 33. However, in other embodiments, one or both of the blade segments 30, 32 may include one shell member with a pressure and suction side. As such, the pressure side shell member 31 and/or suction side shell member 33 described herein may be a pressure side or suction side of a single shell member, respectively. The first blade segment 30 and the second blade segment 32 may be connected by at least an internal beam structure 40 of the internal support structure 36 of the first blade segment 30 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal beam structure 40 into the second blade segment 32. For instance, the beam structure 40 of the first blade segment 30 may be inserted into the support structure 36 of the second blade segment 32. In addition, as shown, the support structure 36 of the second blade segment 32 may extend lengthways for connecting with a blade root section 35 of the rotor blade 28 and with the beam structure 40 of the first blade segment 30 (which is shown in more detail in FIG. 5).

Figure 3:
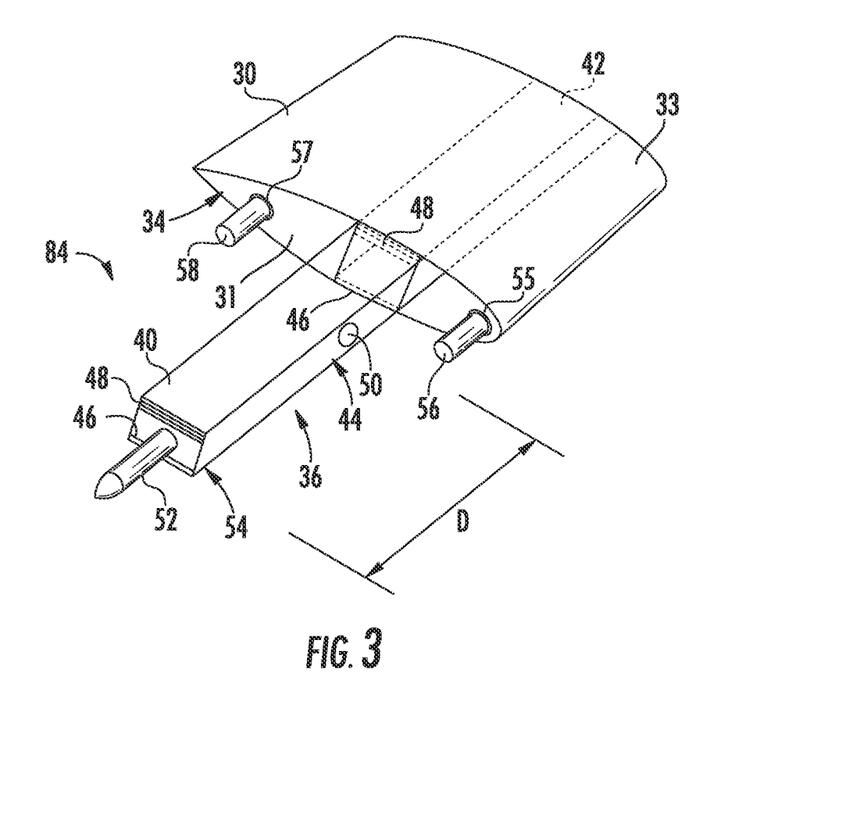
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 may include the beam structure 40 that forms a portion of the support structure 36 of the first blade segment 30 and extends lengthways for structurally connecting with the second blade segment 32. Further, as shown, the beam structure 40 may form a part of the first blade segment 30 having an extension (e.g., a joint portion 84) protruding from an internal section 42, thereby forming an extending spar section. In certain embodiments, the beam structure 40 may include one or more shear webs 44 connected with a suction side spar structure 48 (e.g., a suction side spar cap) and a pressure side spar structure 46 (e.g., a pressure side spar cap). Further, the beam structure 40 may be coupled to an inner surface 88 (see FIG. 6) of the pressure side shell member 31 and/or the suction side shell member 33 of the first blade segment 30. For instance, the pressure side spar structure 46 may be coupled to the inner surface 88 pressure side shell member 31 using an adhesive. Similarly, the suction side spar structure 48 may be coupled to the inner surface 88 of the suction side shell member 33 using an adhesive.

Moreover, as shown, the first blade segment 30 may include one or more first bolt joints towards a first end 54 of the beam structure 40. In one embodiment, the bolt joint may include a pin that is in a tight interference fit with a bush. More specifically, as shown, the bolt joint(s) may include one bolt tube 52 located on the beam structure 40. Thus, as shown, the bolt tube 52 may be oriented in a span-wise direction. Further, the first blade segment 30 may also include a bolt joint slot 50 located on the beam structure 40 proximate to the chord-wise joint 34. Moreover, as shown, the bolt joint slot 50 may be oriented in a chord-wise direction. In one example, there may be a bushing within the bolt joint slot 50 arranged in a tight interference fit with a bolt tube or pin. Further, the first blade segment 30 may include multiple second bolt joint tubes 56, 58 located at the chord-wise joint 34. Thus, as shown, the second bolt joint tubes 56, 58 may include a leading edge bolt joint tube 56 and a trailing edge bolt joint tube 58. Further, each of the second bolt joint tubes 56, 58 may be oriented in a span-wise direction. In addition, as shown, each of the second bolt joint tubes 56, 58 may include multiple flanges 55, 57, respectively, that are configured to distribute compression loads at the chord-wise joint 34.

It is to be noted that the bolt tube 52 located at the first end 54 of the beam structure 40 may be separated span-wise with the multiple second bolt joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the bolt joints connecting the first and second blade segments 30, 32 may include an interference-fit steel bushed joint.

Figure 4:
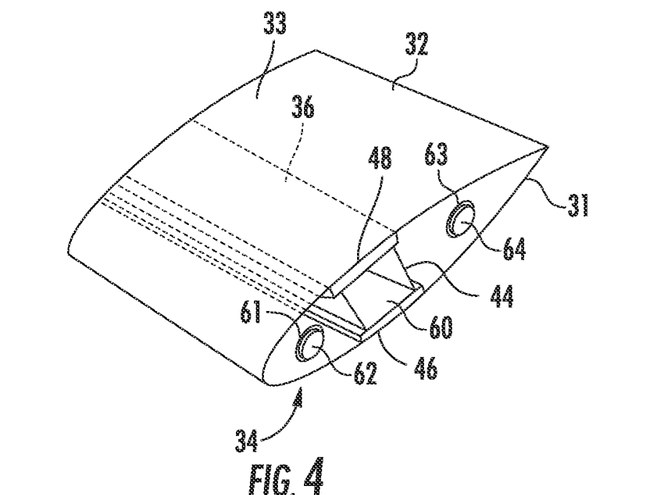
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthways within the second blade segment 32 for receiving the beam structure 40 of the first blade segment 30. The receiving section 60 may include the support structure 36 including a pressure side spar structure 46 and a suction side spar structure 48 (e.g., opposing pressure and suction side spar caps) and one or more shear webs 44 extending therebetween. Further, the receiving section 60 may be coupled to an inner surface of the pressure side shell member 31 and/or the suction side shell member 33 of the second blade segment 32. For instance, the pressure side spar structure 46 may be coupled to the inner surface of the pressure side shell member 31 using an adhesive. Similarly, the suction side spar structure 48 may be coupled to the inner surface of the suction side shell member 33 using an adhesive.

The receiving section 60 may extend lengthways for connecting with the beam structure 40 of the first blade segment 30. For instance, the beam structure 40 may be inserted within the receiving section 60. As shown, the second blade segment 32 may further include bolt joint slots 62, 64 for receiving bolt tubes 56, 58 (shown in FIG. 3) of the first blade segment 30 and forming tight interference fittings. In one example, each of the multiple bolt joint slots 62, 64 may include multiple flanges 61, 63, respectively, that are configured to distribute compression loads at the chord-wise joint 34.

Figure 5:
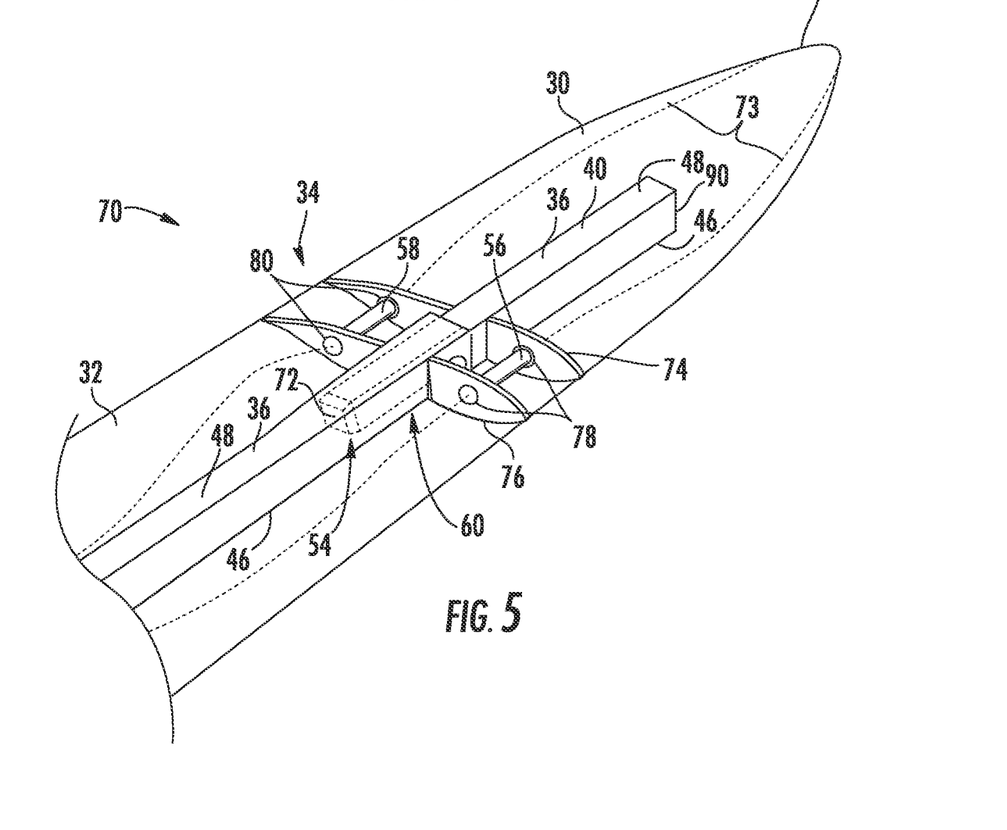
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. As further illustrated, the beam structure 40 may extend from the first end 54 at or approximately at the chord-wise joint 34 to a second end 90. It should be appreciated that in certain embodiments (i.e., when the first blade segment 30 is a tip blade segment) the second end 90 may be positioned at or approximately at the blade tip 17 of the rotor blade 28. Further, the spar structures 46, 48 may be joined together at the second end 90 using any suitable adhesive material or an elastomeric seal. As shown, the beam structure 40 may be received within the receiving section 60 so as to join the first and second blade segments 30, 32 together at the chord-wise joint 34.

Further, as shown, the receiving section 60 may include the suction side spar structure 48 and the pressure side spar structure 46 extending lengthways and supporting the beam structure 40. The receiving section 60 may also include a rectangular fastening element 72 that connects with the bolt tube 52 (see, e.g., FIG. 3) of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge bolt openings 78 and trailing edge bolt openings 80 that allows bolt joint connections between the first and second blade segments 30, 32. For example, as shown, the chord-wise members 74, 76 are connected by bolt tubes 56 and 58 that are in tight interference fit with bushings located in the leading edge bolt openings 78 and the trailing edge bolt openings 80. In another embodiment, each of the spar structures 46, 48, the rectangular fastening element 72, and the chord-wise members 74, 76 may be constructed of a composite material such as glass reinforced fibers or carbon reinforced fibers. In this example, the assembly 70 may also include multiple lightening receptor cables 73 that are embedded between the multiple bolt tubes or pins 56, 58 and the bushing connections attached to the chord-wise members 74, 76.

In certain embodiments, at least a portion of the beam structure 40 may taper between the first end 54 and the second end 90. For example, the internal section 42 of the beam structure 40 may taper between the chord-wise joint 34 and the second end 90. More particularly, the pressure side spar structure 46, the suction side spar structure 48, or both may taper between the chord-wise joint 34 and the second end 90. It should be appreciated that the beam structure 40 may taper in order to accommodate the taper of the first blade segment 30. In one embodiment, the internal section 42 of the beam structure 40 may taper while the external section (e.g., the joint portion 84) may define the same or approximately the same box beam section throughout the distance D, as shown in FIG. 3. However, in other embodiments, the beam structure 40 may taper along the entire length between the first end 54 and the second end 90.

Figure 6:
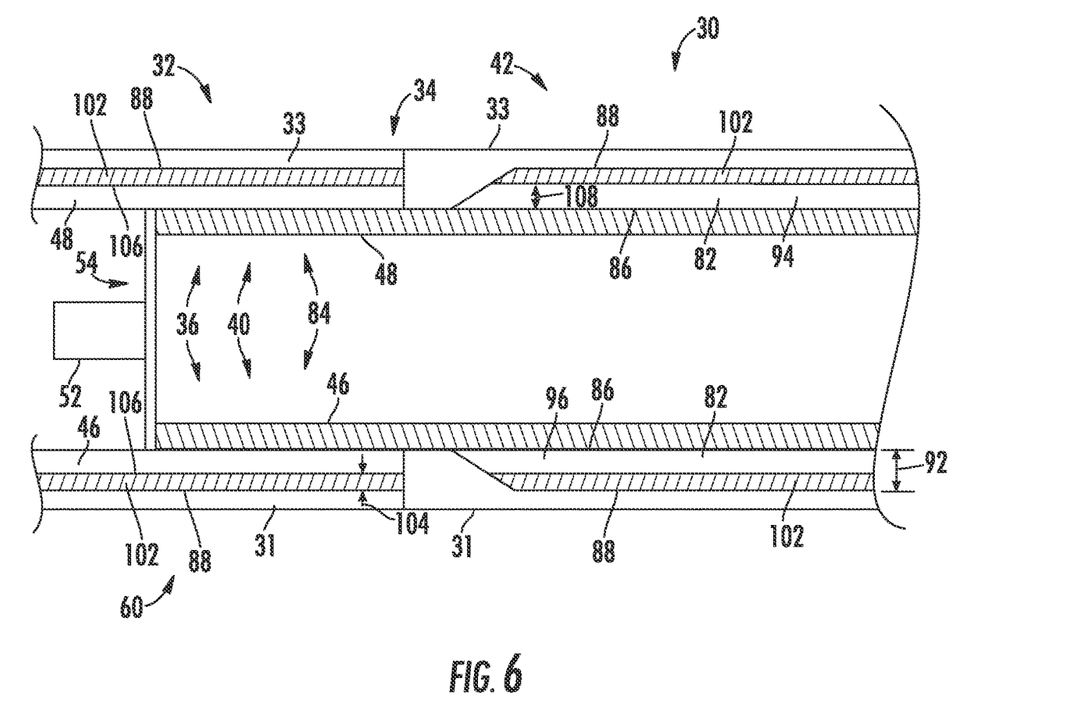
FIG. 6 illustrates one embodiment of the chord-wise joint of the first blade segment according to the present disclosure, particularly illustrating a cross-section along the span of the first blade segment.

Referring now to FIG. 6, one embodiment of the chord-wise joint 34 of the first blade segment 30 is illustrated according to the present disclosure. More particularly, FIG. 6 illustrates a cross-section of the first blade segment 30 and the beam structure 40 along the span of the first blade segment 30. As shown, the joint portion 84 may extend from the internal section 42 of the beam structure 40 such that the first blade segment 30 may be coupled to the second blade segment 32. For instance, the joint portion 84 may be received by the receiving section 60. It should be appreciated that the internal section 42 of beam structure 40 may be secured to the pressure side shell member 31 and/or the suction side shell member 33 as described in more detail below in regards to FIGS. 7 and 8. It should be appreciated that the beam structure 40 of FIG. 6 may generally be configured the same or similar to the beam structures 40 of FIGS. 2, 3, and 5 and may generally be utilized in the rotor blades 28 of FIGS. 1 and 2. Though, in other embodiments, further configurations of the beam structure 40 are contemplated, such as different cross-sectional shapes and/or additional or fewer spar caps and/or shear webs. For instance, in one embodiment, two spar caps and a shear web may be in an I-beam configuration.

As shown in the exemplary embodiment of FIG. 6, the rotor blade 28 may include one or more spacer materials 82 arranged within the first blade segment 30 between an exterior surface 86 of the beam structure 40 and an inner surface 88 of the pressure side shell member 31 and/or the suction side shell member 33. Additionally, spacer material(s) 82 may be secured to the exterior surface 86 of the beam structure 40 and the inner surface 88 of the pressure side shell member 31 and/or the inner surface 88 of the suction side shell member 33 of the first blade segment 30. For instance, the spacer material(s) 82 may be secured to the exterior surface 86 of the beam structure 40, the inner surface(s) 88 of the pressure side shell member 31, and/or the suction side shell member 33 via an adhesive material 102. Moreover, the spacer material(s) 82 may be secured to both the exterior surface 86 of the beam structure 40 and the inner surface(s) 88 of the pressure side shell member 31 and/or the suction side shell member 33 using the adhesive material 102. It should be appreciated that one adhesive material 102 is illustrated between the spacer material(s) 82 and the pressure side and/or suction side shell members 31, 33 for clarity. However, adhesive material 102 may also be between the exterior surface 86 of the beam structure 40 and the spacer material(s) 82. As such, the spacer material(s) 82 may reduce a bond gap 92 between the exterior surface 86 of the beam structure 40 and the inner surface 88 of one of the pressure side shell member 31 or the suction side shell member 33.

In one embodiment, the spacer material(s) 82 may substantially fill the bond gap 92 between the exterior surface 86 of the beam structure 40 and the inner surface 88 of one of the pressure side shell member 31, the suction side shell member 33, or both. For example, the spacer material(s) 82 may fill the bond gap 92 other than the adhesive material 102 used to secure the spacer material(s) 82 to the exterior surface 86 of the beam structure 40 and the inner surface 88 of the pressure and/or suction side shell member 31, 33. It should be appreciated that the adhesive material may include a thermoset and/or a thermoplastic material.

As further illustrated in FIG. 6, the second blade segment 32 may define a second bond gap 104 between an exterior surface 106 of the receiving section 60 the inner surface(s) 88 of the shell members 33, 31. Moreover, the second bond gap 104 may be less than the bond gap 92. It should be appreciated that the relative size of the beam structure 40 and the receiving section 60 may lead to the size difference between the bond gap 92 and the second bond gap 104. More particularly, a smaller beam structure 40 able to be inserted within the receiving section 60 may create a larger bond gap(s) 92 between the exterior surface 86 of the beam structure 40 and the inner surface 88 of the shell member(s) 31, 33 as compared to the second bond gap 104. In such an embodiment, the spacer material(s) 82 may define a thickness 108 of approximately a difference between the second bond gap 104 and the first bond 92 (such as a thickness 108 within 5% of the difference between the second bond gap 104 and the bond gap 92). As such, it should be appreciated that the spacer material(s) 82 may reduce the impact created by the difference in size between the beam structure 40 and the receiving section 60. Though, in other embodiments, it should be appreciated that the spacer material(s) 82 may define a thickness 108 greater than such a difference. Such as any thickness up to approximately the bond gap 92. In still further embodiments, the thickness 108 may be less than the difference between the second bond gap 104 and the bond gap 92.

Figure 7:
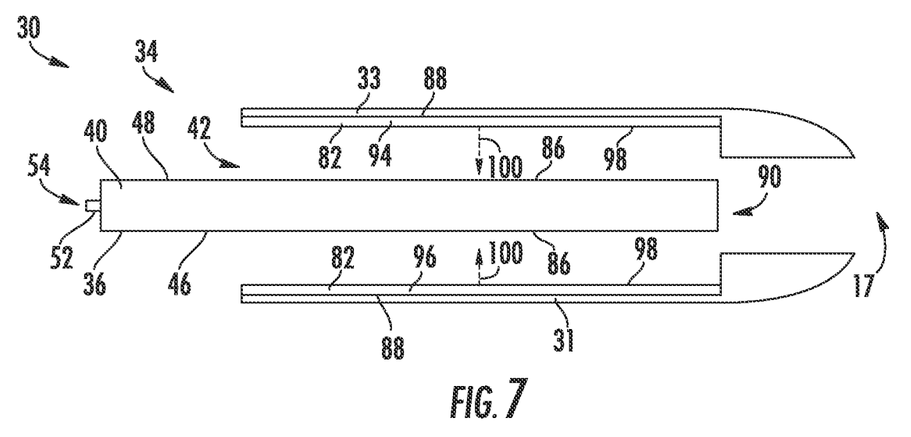
FIG. 7 illustrates one embodiment of the first blade segment according to the present disclosure, particularly illustrating a cross-section of a partially assembled first blade segment.

The spacer material(s) 82 may be adjacent to the first end 54 of the beam structure 40 and extend in a span-wise direction towards the second end 90 (see, e.g., FIGS. 6 and 7). For instance, the spacer material(s) 82 may be positioned near the chord-wise joint 34 and extend toward the second end 90. As shown, the spacer material(s) 82 may be fully housed within the suction and pressure side shell members 31, 33. For example, the spacer material(s) 82 may be secured or coupled to the internal section 42 of the beam structure 40. However, in other embodiments, the spacer material(s) 82 may extend partially from inside the first blade segment 30. For instance, the spacer material(s) 82 may extend at least partially along the extending spar segment. In one embodiment, the spacer material(s) 82 may extend from the chord-wise joint 34 along the internal section 42 of the beam structure 40 up to about 50% of a length of the first blade segment 30. In another embodiment, the spacer material(s) 82 may extend from the chord-wise joint 34 along the beam structure 40 up to about 25% of the length of the first blade segment 30. Moreover, in certain embodiments, the spacer material(s) 82 may extend from the chord-wise joint 34 or approximately the chord-wise joint 34 (e.g., within about 5% of the length of the beam structure 40 from the chord-wise joint 34) to the second end 90.

In certain embodiments, as illustrated in FIG. 6, the one or more spacer materials 82 may include a suction side spacer material 94 arranged between the exterior surface 86 of the suction side spar structure 48 and the inner surface 88 of the suction side shell member 33 and a pressure side spacer material 96 arranged between the exterior surface 86 of the pressure side spar structure 46 and the inner surface 88 of the pressure side shell member 31. It should be appreciated the suction side spacer material 94 and pressure side spacer material 96 may extend along substantially the same length of the beam structure 40 and may start at the substantially the same point adjacent to the first end 54 of the beam structure 40 (e.g., at or near the chord-wise joint 34). However, in other embodiments, the suction side spacer material 94 and pressure side spacer material 96 may extend along different lengths of the beam structure 40 and/or may start at different positions adjacent to the first end 54 of the beam structure 40. Further, in other embodiments, it should be appreciated that the first blade segment 30 may include one spacer material 82, such as the pressure side spacer material 96 or the suction side spacer material 94. In such embodiments, the side opposite the beam structure 40 may be directly coupled, e.g., bonded using an adhesive material, to the shell member 31, 33 opposite the spacer material 82.

It should be recognized that the spacer material(s) 82 may reduce the degree to which the spar structures 46, 48 must be bent and/or contoured at the chord-wise joint 34. For instance, the spacer material(s) 82 may reduce the degree the spar structures 46, 48 must be bent in order to form the joint portion 84 operable with the receiving section 60. Moreover, spar structures 46, 48 made of certain materials, such as pultruded composites or pultruded carbon, may be difficult to bend at the chord-wise joint 34 without adding undesirable stress to the spar structures 46, 48. Further, the spacer material(s) 82 may reduce the amount of adhesive necessary to fill the bond gap 92 between the exterior surface 86 of the beam structure 40 and the inner surface(s) 88 of the pressure side shell member 31 and/or the suction side shell member 33. As such, it should be appreciated that reducing the amount of adhesive necessary to fill the bond gap 92 may provide a better bond between the shell members 31, 33 and the beam structure 40 and improve the structural properties of the rotor blade 28.

It should also be appreciated that the spacer material(s) 82 may generally be contoured to the shape of the exterior surface 86 of the beam structure 40 and/or the inner surface(s) 88 of the pressure side shell member 31 and/or the suction side shell member 33. For instance, the thickness 108 of the spacer material(s) 82 may generally change along the chord between the leading edge and trailing edge. Further, the thickness 108 of the spacer material(s) 82 may generally change along the span between the chord-wise joint 34 and end of the spacer material(s) 82.

Referring now to FIG. 7, a further embodiment of the first blade segment 30 is illustrated according to the present subject matter. Particularly, FIG. 7 illustrates a cross-section of a partially assembled first blade segment 30. As shown, the rotor blade 28 may include the spacer material(s) 82 positioned adjacent to the inner surface 88 of the pressure side and/or suction side shell member 31, 33 of the first blade segment 30 and configured so as to provide one or more linear mounting surfaces 98. The beam structure 40 of the first blade segment 30 may be positioned adjacent to the linear mounting surface(s) 98 of the spacer material(s) 82, as shown generally by arrows 100. It should be appreciated that the first blade segment 30 and beam structure 40 of FIG. 7 may generally be configured the same or similar to the first blade segments 30 and beam structures 40 of FIGS. 2, 3, 5, and 6 and may generally be utilized in the rotor blades 28 of FIGS. 1 and 2. Though, in other embodiments, further configurations of the first blade segment 30 and/or the beam structure 40 are contemplated.

Additionally, the spacer material(s) 82 may be secured (e.g., by use of the adhesive material) to the pressure side shell member 31 and/or the suction side shell member 33 of the first blade segment 30. Further, the exterior surface 86 of the beam structure 40 may be subsequently secured to the spacer material(s) 82, e.g., the linear mounting surface(s) 98 provided by the spacer material(s) 82. For instance, in one embodiment, a suction side spacer material 94 may be secured to the suction side shell member 33. Subsequently, the exterior surface 86 of the beam structure 40 (e.g., the exterior surface 86 of the suction side spar structure 48) may be secured to the suction side spacer material 94. Additionally, the pressure side spacer material 96 may be secured to the pressure side shell member 31. Subsequently, the exterior surface 86 of the beam structure 40 (e.g., the exterior surface 86 of the pressure side spar structure 46) may be secured to the pressure side spacer material 96.

Figure 8:
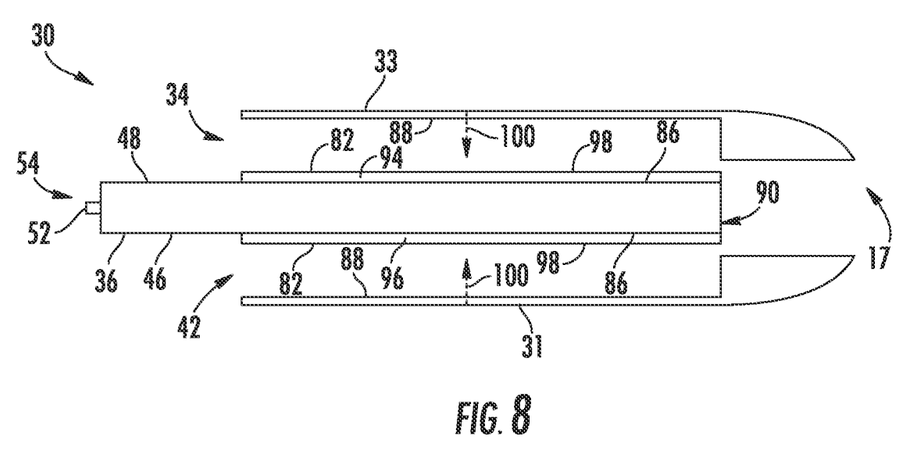
FIG. 8 illustrates a further embodiment of the first blade segment according to the present disclosure, particularly illustrating a cross-section of a partially assembled first blade segment; and, FIG. 9 illustrates a flow chart of one embodiment of a method of joining a first blade segment of a rotor blade of a wind turbine to a second blade segment of the rotor blade of the wind turbine at a chord-wise joint according to the present disclosure.

Referring now to FIG. 8, another embodiment of the first blade segment 30 is illustrated according to the present subject matter. Particularly, FIG. 8 illustrates a cross-section of a partially assembled first blade segment 30. As illustrated, the rotor blade 28 may include the spacer material(s) 82 positioned adjacent to the exterior surface 86 of the beam structure 40 of the first blade segment 30 so as to provide the linear mounting surface(s) 98. Further, the internal surface(s) 88 of the pressure side shell member 31 and/or suction side shell member 33 may positioned adjacent to the linear mounting surface(s) 98 of the spacer material(s) 82, as shown generally by arrows 100. It should be appreciated that the first blade segment 30 and beam structure 40 of FIG. 8 may generally be configured the same or similar to the first blade segments 30 and beam structures 40 of FIGS. 2, 3, 5, and 6 and may generally be utilized in the rotor blades 28 of FIGS. 1 and 2. Though, in other embodiments, further configurations of the first blade segment 30 and/or the beam structure 40 are contemplated.

Additionally, the spacer material(s) 82 may be secured to the exterior surface 86 of a pressure side spar structure 46 and/or suction side spar structure 48 located on a pressure side and a suction side of the first blade segment 30, respectively. Further, the inner surface(s) 88 of the pressure side shell member 31 and/or the suction side shell member 33 may be subsequently secured to the spacer material(s) 82, e.g., the linear mounting surface(s) 98 provided by the spacer material(s) 82.

It should be appreciated that forming the first blade segment 30 as shown in FIG. 8 may allow the final bond between the spacer material(s) 82 and the pressure and/or suction side shell members 31, 33 to be examined using non-destructive testing techniques. For instance, ultrasonic testing may be utilized to ensure a strong final bond is formed between the spacer material(s) 82 and the pressure and/or suction side shell members 31, 33. Contrarily, securing the spacer material(s) 82 to the pressure and/or suction side shell members 31, 33 and then subsequently to the beam structure 40 may make such examination more difficult. More particularly, certain non-destructive testing techniques, such as ultrasonic testing, may have difficulty penetrating certain types of materials (e.g., spacer material(s) 82 made of foam). As such, in the arrangement of FIG. 7, only the initial bond between the spacer material(s) 82 and the pressure and/or suction side shell members 31, 33 may be examined using ultrasonic testing while the final bond between the spacer material(s) 82 and the beam structure 40 may be obscured by the spacer material(s) 82. It should be appreciated that the ability to examine the final bond (e.g., using non-destructive testing techniques) may be critical as such a bond may generally be inaccessible after the first blade segment 30 is assembled.

Referring still to FIG. 8, in one embodiment, the one or more spacer materials 82 may include the suction side spacer material 94 and the pressure side spacer material 96. As such, the suction side spacer material 94 may be secured (e.g., via an adhesive material) to the exterior surface 86 of a suction side spar structure 48 located on a suction side of the first blade segment 30. Subsequently, the inner surface 88 of the suction side shell member 33 may be secured to the suction side spacer material 94, such as to the linear mounting surface 98. Additionally, the pressure side spacer material 96 may be secured (e.g., via an adhesive material) to the exterior surface 86 of the pressure side spar structure 46 located on the pressure side of the first blade segment 30. Subsequently, the inner surface 88 of the pressure side shell member 31 may be secured to the pressure side spacer material 96, such as to the linear mounting surface 98.

It should be appreciated that the linear mounting surface(s) 98 near the chord-wise joint 34 and/or along the internal section 42 of the beam structure 40 may reduce the amount of the adhesive material needed to bond the internal support structure 36 to the pressure side shell member 31 and/or the suction side shell member 33. Additionally, or alternatively, the linear mounting surface(s) 98 may reduce the degree to which the beam structure 40 must be bent near the chord-wise joint 34 in order to be received within the receiving section 60 of the second blade segment 32. For instance, in at least one embodiment, the exterior surface 86 of the beam structure 40 oriented toward the pressure and/or suction side of the first blade segment 30 may be linear or substantially linear near the chord-wise joint 34. Further, it should be recognized that the pressure and/or suction side spar structures 46, 48 may be made of rigid materials (e.g., pultruded composite material and/or pultruded carbon materials) that are not easily pliable and thus difficult to bend or contour into a smaller cross-section able to be inserted within the receiving section 60 of the second blade segment 32.

In one embodiment, the spacer material(s) 82 may be constructed, at least in part, from at least one of a foam material, a wood material, a cork material, a fiber material, a composite material, a polymer material or combinations thereof. In certain embodiments, the spacer material(s) 82 may be at least partially compressible in order to accommodate the strain on the shell member(s) 31, 33 and/or the beam structure 40. For instance, in one embodiment, the spacer material(s) may elastically deform or approximately elastically deform up to at least 3500 microstrain, such as up to at least 4500 microstrain, or, more particularly, up to at least 6000 microstrain. In one exemplary embodiment, the beam structure 40 may be constructed, at least in part, of a pultruded carbon and/or pultruded composite material. For instance, at least one of the suction side spar structure 48 or the pressure side spar structure 46 may include a pultruded carbon composite material. Further, the pressure side shell member 31, pressure side spacer material 96, pressure side spar structure 46, suction side spar structure 48, suction side spacer material 94, and/or suction side shell member 33 may generally be formed, at least in part, from biax composite plies and/or unidirectional composite plies including one or more fibers. In such embodiments, the fiber material(s) may include glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

In further embodiments, the shell member(s) 31, 33, spacer material(s) 82, support structure(s) 36, adhesive materials, and/or any part or combination of the preceding may include a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 9:
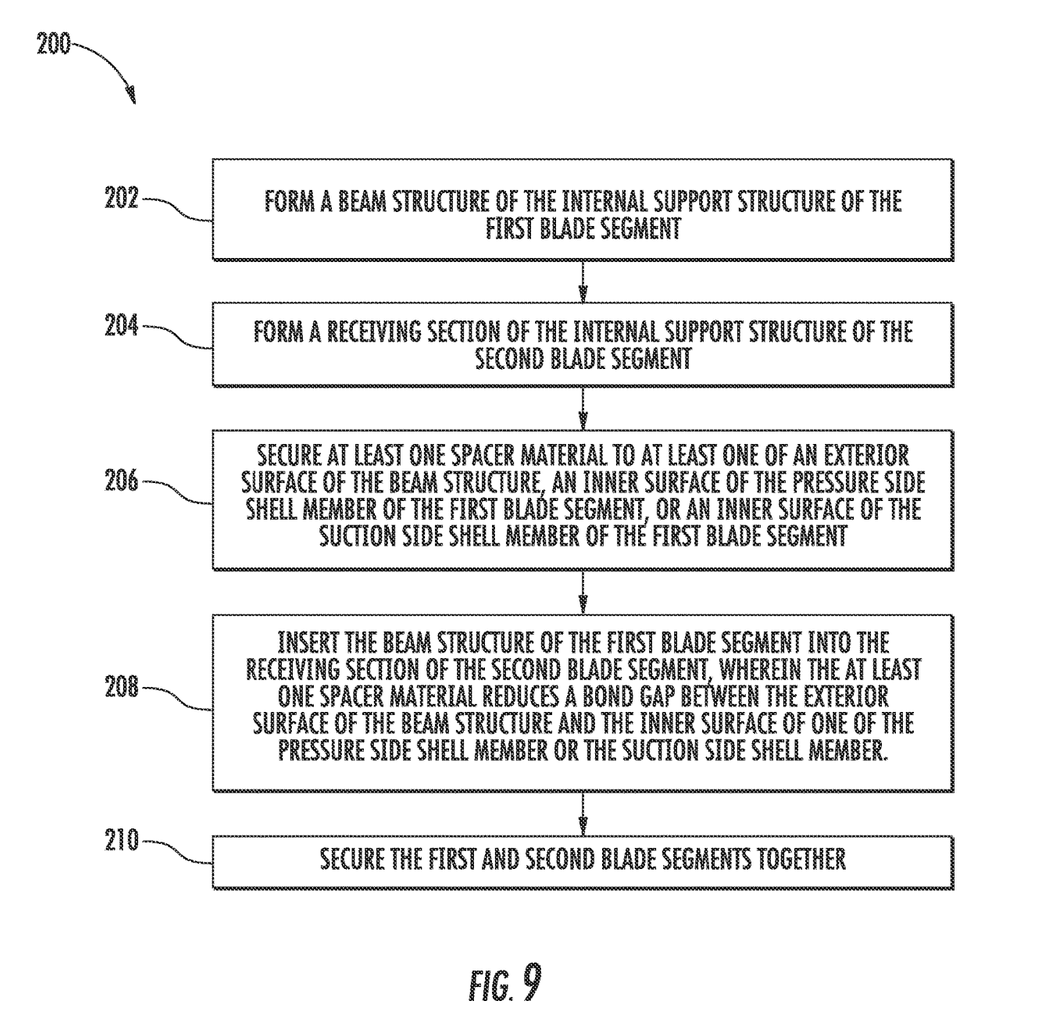

Referring now to FIG. 9, a flow chart 200 of a method of joining a first blade segment of a rotor blade of a wind turbine to a second blade segment of the rotor blade of the wind turbine at a chord-wise joint is depicted according to the present disclosure. In general, the method 200 will be described herein with reference to the first and second blade segments 30, 32 and beam structures 40 shown in FIGS. 2-8. However, it should be appreciated that the disclosed method 200 may be implemented with a segmented rotor blade 28 having any other configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 200 may include (202) forming a beam structure of the internal support structure of the first blade segment. The method 200 may further include (204) forming a receiving section of the internal support structure of the second blade segment. Another step may include securing one or more spacer materials to an exterior surface of the beam structure and/or an inner surface of the shell member(s) of the first blade segment. For instance, as shown at (206), the method 200 may include securing one or more spacer materials to an exterior surface of the beam structure, an inner surface of the pressure side shell member of the first blade segment, and/or an inner surface of the suction side shell member of the first blade segment. In one embodiment, securing the one or more spacer materials 82 to an exterior surface 86 of the beam structure 40, an inner surface 88 of the pressure side shell member 31 of the first blade segment 30, and/or an inner surface 88 of the suction side shell member 33 of the first blade segment 30 may further include securing the spacer material(s) 82 to the exterior surface 86 of the beam structure 40 and subsequently securing the beam structure 40 to the pressure side shell member 31 and/or the suction side shell member 33 of the first blade segment 30, as shown particularly in FIG. 8.

In another embodiment, securing the one or more spacer materials 82 to an exterior surface 86 of the beam structure 40, an inner surface 88 of the pressure side shell member 31 of the first blade segment 30, and/or an inner surface 88 of the suction side shell member 33 of the first blade segment 30 may further may include securing the spacer material(s) 82 to the pressure side shell member 31 and/or the suction side shell member 33 of the first blade segment 30 and subsequently securing the beam structure 40 to the spacer material(s) 82.

In a still further embodiment, securing the one or more spacer materials 82 to an exterior surface 86 of the beam structure 40, an inner surface 88 of the pressure side shell member 31 of the first blade segment 30, and/or an inner surface 88 of the suction side shell member 33 of the first blade segment 30 may further include securing the spacer material(s) 82 to an exterior surface 86 of a pressure side spar structure 46 and/or a suction side spar structure 48 located on a pressure side and a suction side of the first blade segment 30, respectively. In one such embodiment, the one or more spacer materials 82 may include a suction side spacer material 94 and a pressure side spacer material 96. As such, the method 200 may further include securing the suction side spacer material 94 to the exterior surface 86 of the suction side spar structure 48 located on a suction side of the first blade segment 30 and/or the inner surface 88 of the suction side shell member 33 of the first blade segment 30. Additionally, the method 200 may include securing the pressure side spacer material 96 to the exterior surface 86 of a pressure side spar structure 46 located on a pressure side of the first blade segment 30 and/or the inner surface 88 of the pressure side shell member 31 of the first blade segment 30.

The method may also include (208) inserting the beam structure of the first blade segment into the receiving section of the second blade segment. As such, the at least one spacer material 82 may reduce a bond gap 92 between the exterior surface 86 of the beam structure 40 and the inner surface 88 of shell member(s). For instance, the spacer material(s) 82 may reduce a bond gap 92 between the exterior surface 86 of the beam structure 40 and the inner surface 88 of one of the pressure side shell member 31 or the suction side shell member 33. Additionally, the method 200 may include 210 securing the first and second blade segments 30, 32 together, as described and shown generally in regards to FIG. 5.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
   a first blade segment and a second blade segment extending in opposite directions from a chord-wise joint, each of the first and second blade segments comprising one or more shell members and an internal support structure,
   the internal support structure of the first blade segment comprising:
      a beam structure extending spanwise between a first end at the chord-wise joint and a second end at a tip of the rotor blade, the beam structure defining one or more shear webs connected with a suction side spar cap and a pressure side spar cap of the first blade segment, the first end of the beam structure extending spanwise beyond the chord-wise joint;
   the internal support structure of the second blade segment comprising:
      a receiving section that receives the beam structure of the first blade segment, the beam structure and the receiving section coupled to an inner surface of the one or more shell members of the first blade segment and the second blade segment, respectively, wherein the receiving section includes one or more shear webs connected with a suction side spar cap and a pressure side spar cap, the beam structure fitting within the receiving section such that the spar caps in the beam structure are offset from the shell members of the first blade segment as compared to the spar caps and shell members of the second blade segment by a first bond gap; and,
   at least one spacer material arranged within the first blade segment between an exterior surface of the beam structure and the inner surface of the one or more shell members so as to reduce the first bond gap between the exterior surface of the beam structure and the inner surface of the one or more shell members, wherein the at least one spacer material spans a continuous distance from the first end to the second end of the beam structure.

2. The rotor blade of claim 1, wherein the at least one spacer material is constructed, at least in part, from at least one of a foam material, a wood material, a cork material, a fiber material, a composite material, or combinations thereof.

3. The rotor blade of claim 1, wherein the one or more shell members comprises a suction side shell member and a pressure side shell member and wherein the suction side and pressure side spar caps taper from the first end to the second end.

4. The rotor blade of claim 3, wherein the at least one spacer material comprises a suction side spacer material arranged between an exterior surface of the suction side spar cap and the inner surface of the suction side shell member and a pressure side spacer material arranged between an exterior surface of the pressure side spar cap and the inner surface of the pressure side shell member.

5. The rotor blade of claim 1, wherein the at least one spacer material is secured to the exterior surface of the beam structure and the inner surface of the one or more shell members via an adhesive.

6. The rotor blade of claim 1, wherein the at least one spacer material is adjacent to the first end of the beam structure and extends in a span-wise direction towards the second end.

7. The rotor blade of claim 1, wherein the at least one spacer material fills the first bond gap between the exterior surface of the beam structure and the inner surface of the one or more shell members.

8. The rotor blade of claim 1, wherein the second blade segment defines a second bond gap between an exterior surface of the receiving section the inner surface of the one or more shell members, wherein the second bond gap comprises a thickness less than a thickness of the first bond gap, and wherein the at least one spacer material defines a thickness of a difference between the second bond gap and the first bond gap.

9. The rotor blade of claim 1, wherein the beam structure is constructed, at least in part, of a pultruded carbon composite material.

10. The rotor blade of claim 3, wherein at least one of the suction side spar cap or the pressure side spar cap comprises a pultruded carbon composite material.

11. A method of joining a first blade segment of a rotor blade of a wind turbine to a second blade segment of the rotor blade of the wind turbine at a chord-wise joint, wherein each of the first and second rotor blade segments comprises one or more shell members and an internal support structure, the method comprising:
   forming a beam structure extending spanwise between a first end at the chord-wise joint and a second end at a tip of the rotor blade, the beam structure defining one or more shear webs connected with a suction side spar cap and a pressure side spar cap of the first blade segment, the first end of the beam structure extending spanwise beyond the chord-wise joint;
   forming a receiving section of the internal support structure of the second blade segment, wherein the receiving section includes one or more shear webs connected with a suction side spar cap and a pressure side spar cap, the beam structure configured to fit within the receiving section such that the spar caps in the beam structure are offset from the shell members of the first blade segment as compared to the spar caps and shell members of the second blade segment by a first bond gap;
   securing at least one spacer material to at least one of an exterior surface of the beam structure or an inner surface of the one or more shell members of the first blade segment wherein the at least one spacer material spans a continuous distance from the first end to the second end of the beam structure;

inserting the beam structure of the first blade segment into the receiving section of the second blade segment, wherein the at least one spacer material reduces the first bond gap between the exterior surface of the beam structure and the inner surface of the one or more shell members; and, securing the first and second blade segments together.

12. The method of claim 11, wherein the one or more shell members comprises a suction side shell member and a pressure side shell member, and wherein securing the at least one spacer material to at least one of an exterior surface of the beam structure or an inner surface of the one or more shell members of the first blade segment further comprises:

securing the at least one spacer material to the exterior surface of the beam structure and subsequently securing the beam structure to at least one of the pressure side shell member or the suction side shell member of the first blade segment.

13. The method of claim 11, wherein the one or more shell members comprises a suction side shell member and a pressure side shell member, and wherein securing the at least one spacer material to at least one of an exterior surface of the beam structure or an inner surface of the one or more shell members of the first blade segment further comprises:

securing the at least one spacer material to at least one of the pressure side shell member or the suction side shell member of the first blade segment and subsequently securing the beam structure to the at least one spacer material.

14. The method of claim 11, wherein securing the at least one spacer material to at least one of an exterior surface of the beam structure or an inner surface of the one or more shell members of the first blade segment further comprises:

securing the at least one spacer material to an exterior surface of at least one of the pressure side spar cap or the suction side spar cap located on a pressure side and a suction side of the first blade segment, respectively.

15. The method of claim 14, wherein the one or more shell members comprises a suction side shell member and a pressure side shell member, and wherein the at least one spacer material comprises a suction side spacer material and a pressure side spacer material, the method further comprising:

securing the suction side spacer material to at least one of the exterior surface of the suction side spar cap located on a suction side of the first blade segment or the inner surface of the suction side shell member of the first blade segment; and, securing the pressure side spacer material to at least one of the exterior surface of the pressure side spar cap located on a pressure side of the first blade segment or the inner surface of the pressure side shell member of the first blade segment.

16. The method of claim 11, wherein the at least one spacer material is constructed, at least in part, from at least one of a foam material, a wood material, a cork material, a fiber material, a composite material, or combinations thereof.

17. The method of claim 11, wherein the at least one spacer material fills the first bond gap between the exterior surface of the beam structure and the inner surface of the one or more shell members.

18. The method of claim 11, wherein the second blade segment defines a second bond gap between an exterior surface of the receiving section of the inner surface of the one or more shell members, and wherein the at least one spacer material defines a thickness of a difference between the second bond gap and the first bond gap.

19. A rotor blade for a wind turbine, comprising:

a first blade segment and a second blade segment extending in opposite directions from a chord-wise joint, each of the first and second blade segments comprising a pressure side shell member, a suction side shell member, and an internal support structure;

the internal support structure of the first blade segment comprising:
  a beam structure positioned adjacent to a linear mounting surface of at least one spacer material, the beam structure extending spanwise between a first end at the chord-wise joint and a second end at the tip of the rotor blade, the beam structure defining one or more shear webs connected with a suction side spar cap and a pressure side spar cap of the first blade segment, the first end of the beam structure extending spanwise beyond the chord-wise joint, the internal support structure of the second blade segment comprising:
  a receiving section that receives the beam structure of the first blade segment, the beam structure and the receiving section coupled to an inner surface of the one or more shell members of the first blade segment and the second blade segment, respectively, wherein the receiving section includes one or more shear webs connected with a suction side spar cap and a pressure side spar cap, the beam structure fitting within the receiving section such that the spar caps in the beam structure are offset from the shell members of the first blade segment as compared to the spar caps and shell members of the second blade segment by a first bond gap; and, the at least one spacer material positioned adjacent to an inner surface of the pressure side or suction side shell member of the first blade segment and configured so as to provide the linear mounting surface, wherein the at least one spacer material spans a continuous distance from the first end to the second end of the beam structure.

* * * * *